United States Patent

Rosiek

[15] 3,699,637
[45] Oct. 24, 1972

[54] METHOD OF LOCKING A BOLT IN AN ASSEMBLY BY EXTERNAL STAKING

[72] Inventor: Frank C. Rosiek, Royal Oak, Mich.

[73] Assignee: The Budd Company, Philadelphia, Pa.

[22] Filed: Aug. 19, 1970

[21] Appl. No.: 65,068

[52] U.S. Cl. ..................29/432.1, 29/509, 29/520, 29/525, 29/526, 151/41.73
[51] Int. Cl. ...........................................B23p 11/00
[58] Field of Search.....29/432, 432.1, 525, 509, 520, 29/526; 151/41.73

[56] References Cited

UNITED STATES PATENTS

| | | | |
|---|---|---|---|
| 2,127,969 | 8/1938 | Dingwerth | 29/520 |
| 2,685,320 | 8/1954 | Rosan | 29/520 UX |
| 3,456,972 | 7/1969 | Drotar | 151/41.73 X |

FOREIGN PATENTS OR APPLICATIONS

| | | | |
|---|---|---|---|
| 934,157 | 8/1963 | Great Britain | 29/520 |
| 955,813 | 4/1964 | Great Britain | 29/432 |
| 1,027,677 | 4/1966 | Great Britain | 151/41.73 |
| 334,019 | 1/1936 | Italy | 29/520 |

*Primary Examiner*—Charlie T. Moon
*Attorney*—Thomas I. Davenport, Edward M. Farrell, John D. Sowell, Alford L. Trueax, Jr. and William R. Nolte

[57] ABSTRACT

A method of securing a bolt or shaft in an aperture of an assembly by providing a depressed area on the surface of the bolt and flowing metal surrounding the aperture into the cavity of the depressed area by application of force to a staking tool to cause such metal flow.

2 Claims, 6 Drawing Figures

PATENTED OCT 24 1972

3,699,637

INVENTOR.
FRANK C. ROSIEK
BY
*A. L. Truax, Jr.*
ATTORNEY

METHOD OF LOCKING A BOLT IN AN ASSEMBLY BY EXTERNAL STAKING

This invention relates to a method of securing a bolt or shaft in an aperture but more particularly to a method of staking a bolt positioned in an aperture in a hub for securing a disk to a hub in a hub-disk assembly.

The present method of securing a hub and disk together relies on a frictional engagement of splines on the bolt being press-fit into an aperture in the hub with the head of the bolt engaging the disk. In moving the assembly, the dimensional stability can be changed by rough handling. An object of this novel method is to provide a locked assembly that is less susceptible to dimensional alteration due to impact after the parts are assembled.

The same secure fitting could be obtained by a more expensive means such as welding the bolt in place. The present method does not expose the assembly to the elevated temperatures required in a welding operation and still provides a positive locked bolt as can be seen by reference to the following specification and drawings wherein.

Figure 1:
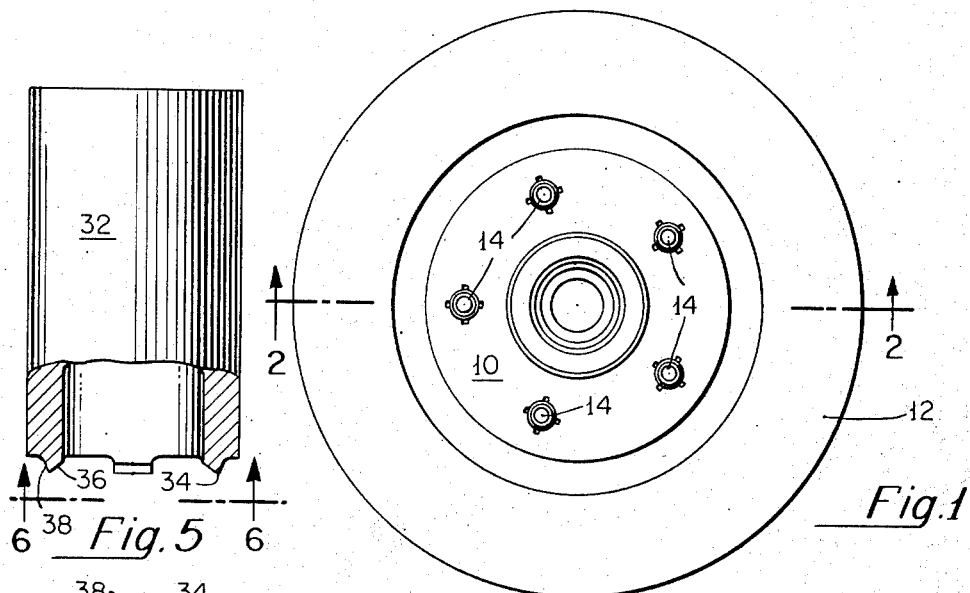
FIG. 1 is a plan view of a hub and disk assembly showing the novel stud bolt and staking method of this invention for securing the hub and disk together.
Figures 2, 5, 6:
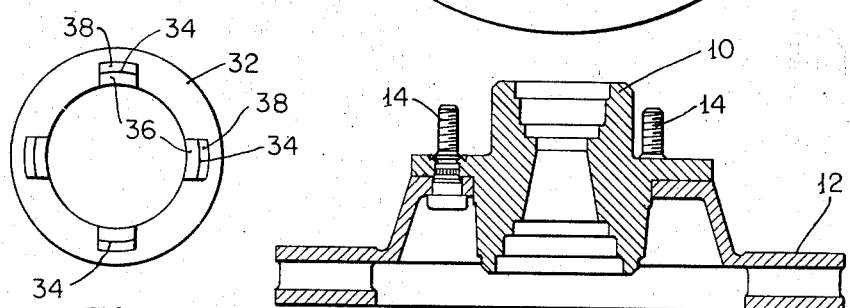
FIG. 2 is a view, in the direction of the arrows, substantially along line 2—2 of FIG. 1.
FIG. 5 is a side view, with portions broken away, of the staking tool.
FIG. 6 is a view in the direction of the arrows, substantially along line 6—6 of FIG. 5.

Referring to the drawings, as seen in FIGS. 1 and 2, a wheel hub 10 is secured to a brake disk 12 by a plurality of bolts 14.

Figure 3:
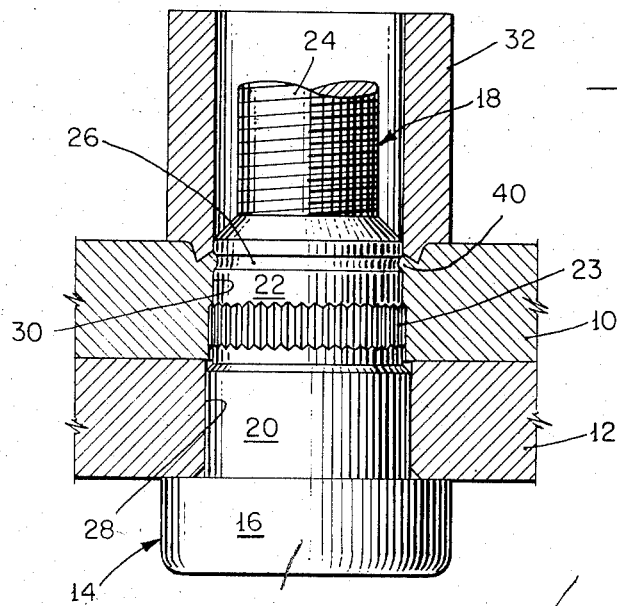
FIG. 3 is an enlarged sectional view of FIG. 2, with portions broken away, with the stud bolt securing two parts together and the staking tool in position at the conclusion of the staking operation.
Figure 4:
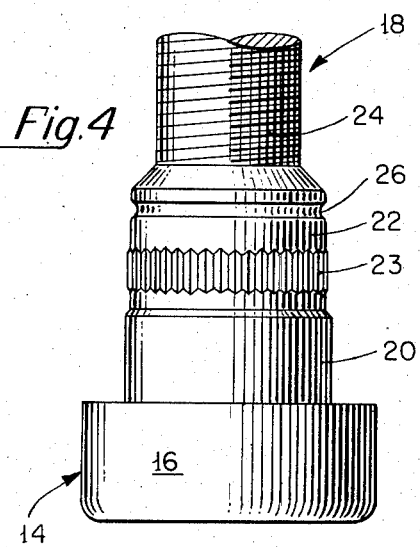
FIG. 4 shows the stud bolt used in this assembly.

As best seen in the enlarged drawings of FIGS. 3 and 4, each of the bolts includes a head portion 16 and a shaft portion 18. The shaft portion 18 has a stepped surface that provides basically three diameters, a first or largest diameter section 20, a second or intermediate diameter section 22, and a third or smallest diameter section 24 which is the threaded section of the bolt 14. The second or intermediate diameter section 22 is provided with a series of splines or serations 23 which extend above the surface of the shaft and are generally parallel to the longitudinal axis of the bolt 14. The diameter of the outermost portions of the serations 23 is less than the diameter of section 20. A groove 26 is also formed as a depression or cavity on the surface of the intermediate diameter 22.

The brake disk 12 has a plurality of apertures 28 with a diameter equal to the diameter of section 20 of the bolts 14 and the wheel hub 10 has a plurality of apertures 30 with a diameter equal to the diameter of section 22 of the bolts 14.

In securing the wheel hub 10 and brake disk 12 together, the apertures 30 and 28 of the respective parts are aligned, and a bolt 14 is inserted in each set of apertures. During the insertion of bolt 14 through apertures 28 of the brake disk 12, the splines 23 are press-fit into the apertures 30 of the wheel hub 10 until the head 14 of the bolt contacts the brake disk 12. The procedure thus far is old in the art and is extensively used in assembling brake disks and wheel hubs.

To overcome the problem of loosened assemblies during handling, an additional operation is performed to better secure the wheel hub and brake disk together.

As best seen in FIGS. 3, 5, and 6, a staking tool 32 having a plurality of staking edges 34 is used to stake the bolt 14 to the wheel hub 10 and lock the assembly together. Each edge 34 is formed by the juncture of two surfaces 36, 38. The surface 36 is positioned adjacent the bolt 14 and presents a greater angle perpendicular to the surface to be staked than the surface 38 so that the metal 40 displaced by the staking operation will flow toward the bolt 14 and enter the cavity 26 thereof. Thus the bolt 14 will be secured in the aperture 30 from rotative movement by the splines 23 and from longitudinal movement by the metal 40 engaging the cavity 26 as well as by the press-fit of the splines 23 in the walls of aperture 30.

Thus, the additional operation consists of suitably supporting the assembled wheel hub 10, brake disk 12 and bolts 14, placing the staking tool 32 about each bolt 14, as seen in FIG. 3, and then applying sufficient force to flow the material 40 into the depressions 26 thereof, so that the bolts are better secured longitudinally in the assembly.

While but one embodiment of this invention has been shown and described, variations and modifications of this method may be made without departing from the scope of the following claims.

I claim:

1. A method of securing a first member to a second member, each of said members having an aperture therein, one of said apertures having a greater diameter than the other, and a shaft for filling said apertures and securing said members together, said shaft having a head portion on one end larger than said apertures, a threaded portion extending from the other end of said shaft, a series of raised serations about the shaft having a diameter greater than the diameter of the smaller aperture, and an annular cavity on said shaft between said threaded portion and serations, the steps for securing the members include:
   1. Positioning the first and second members adjacent each other with their apertures in alignment,
   2. Inserting said shaft into and through the apertures until the head portion engages one of said members and the serations on the shaft are embedded in the smaller diameter aperture,
   3. Positioning a staking tool having four staking edges adjacent the protruding shaft and the other of said members, each staking edge having two faces, the face adjacent said shaft having a greater angle to the part than the face more remote from the shaft for moving the material of the other of said members into the cavity during the staking operation,
   4. Applying a force to the staking tool for flowing material from said other member into the cavity on the shaft in the apertures and securing the members together.

2. The method claimed in claim 1 wherein said second step includes a pressing operation for press fitting the serations of the shaft into the walls of the smaller aperture.

* * * * *